Dec. 22, 1959  R. B. WILLIAMS, JR  2,918,269
INTEGRATING CONVEYOR SCALE
Filed Sept. 25, 1956  7 Sheets-Sheet 1
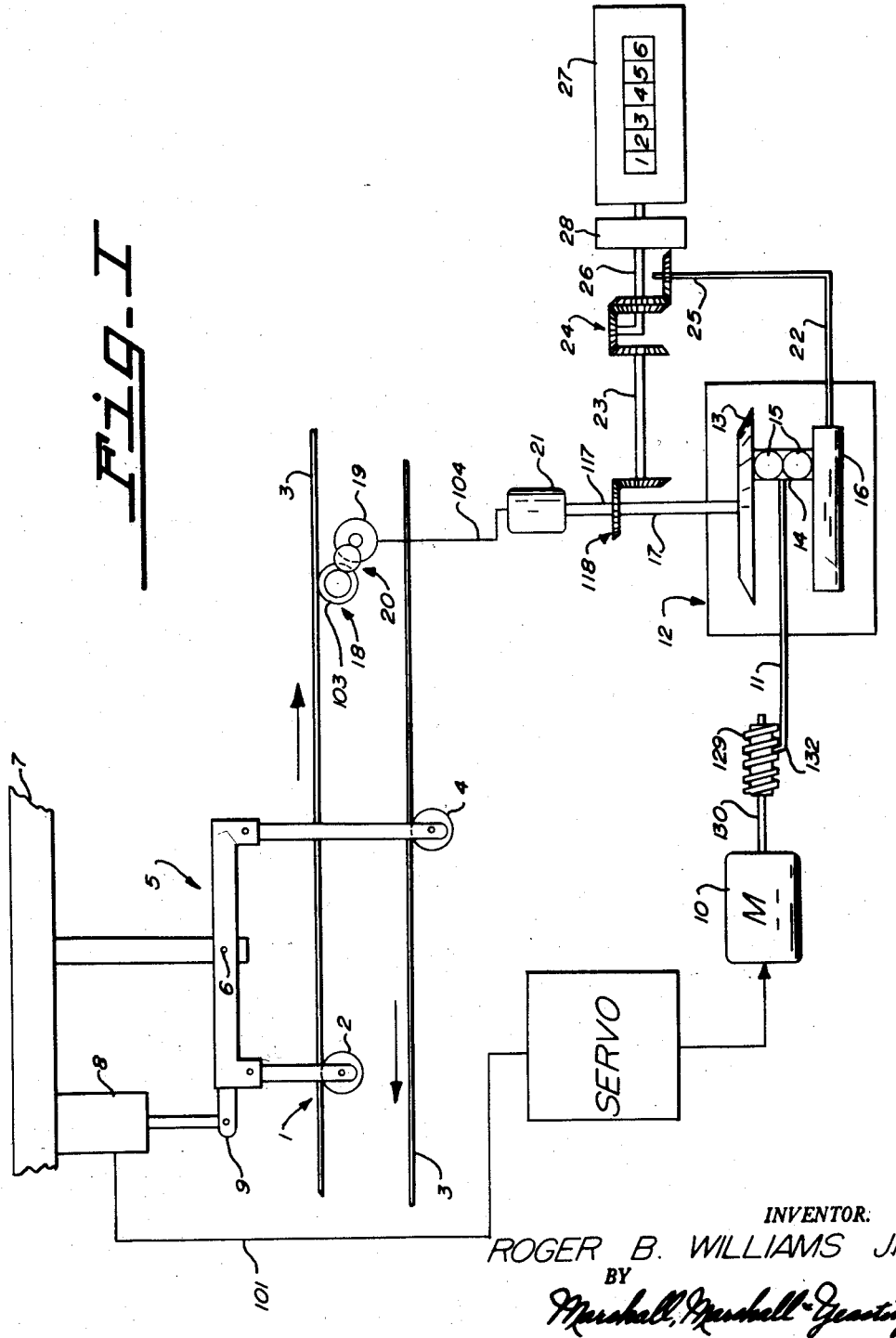
INVENTOR:
ROGER B. WILLIAMS JR.
BY
Marshall, Marshall & Gensting
ATTORNEYS

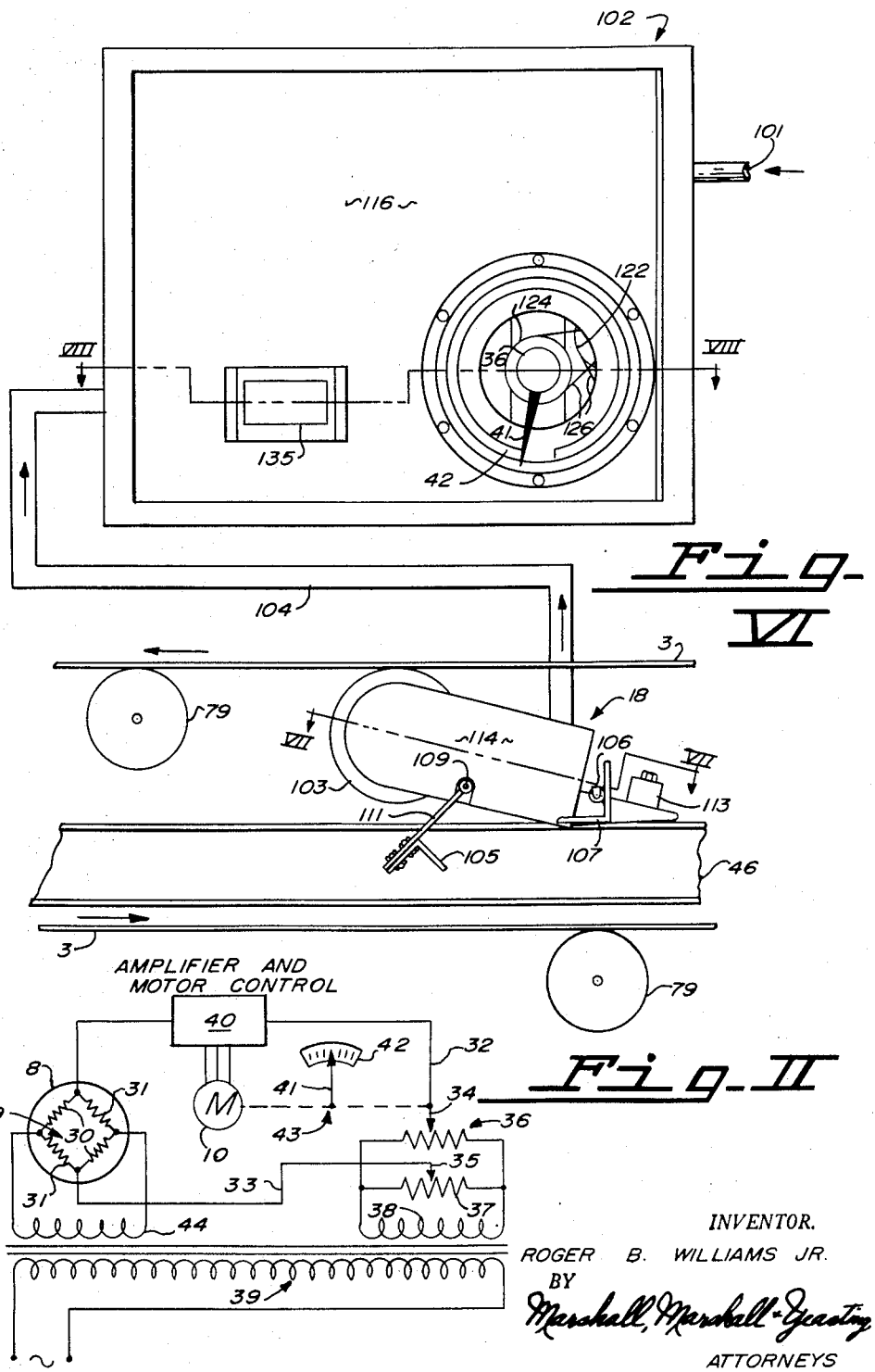

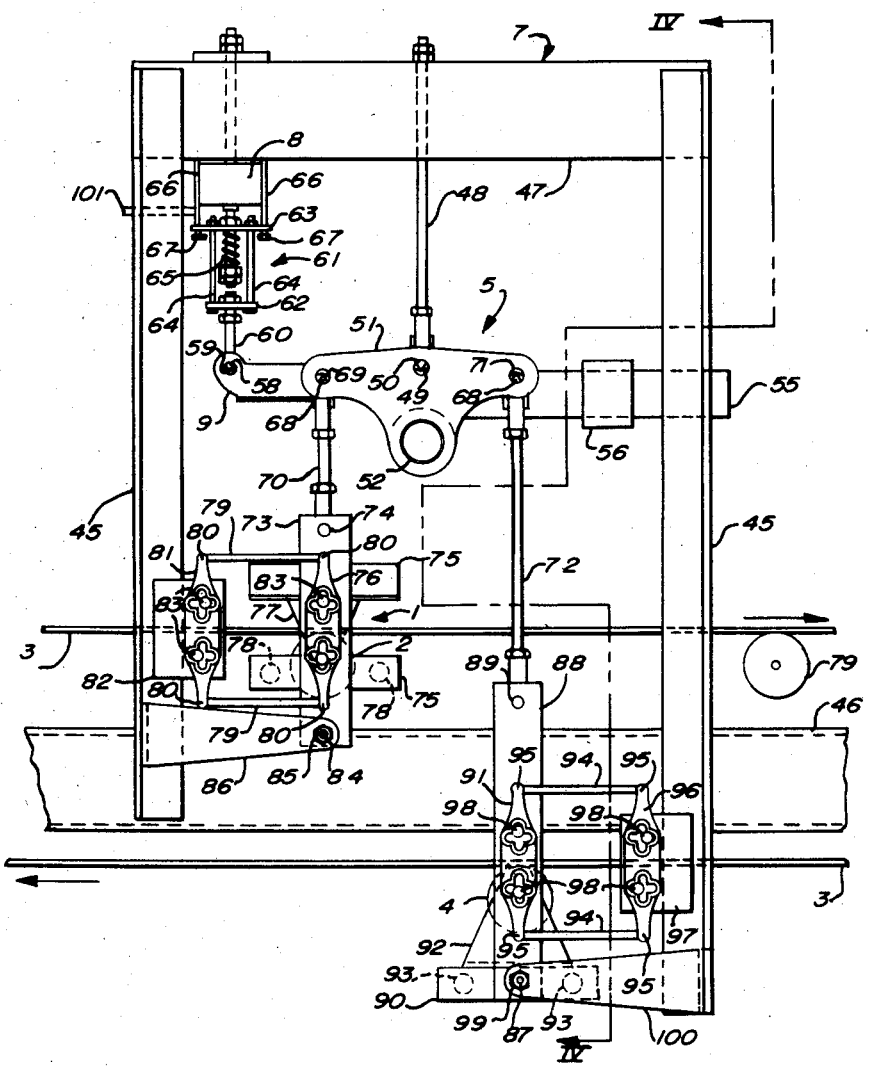
Fig. III

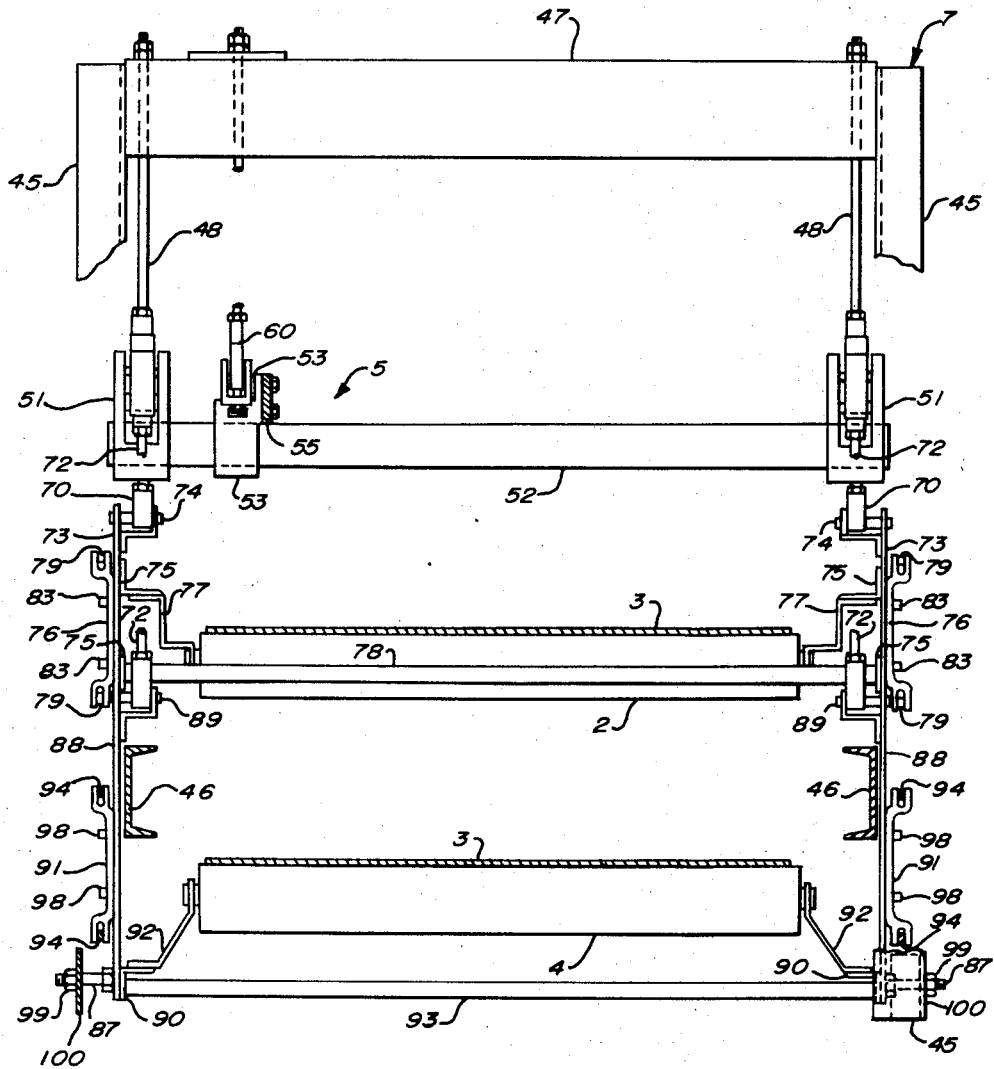
Fig. IV

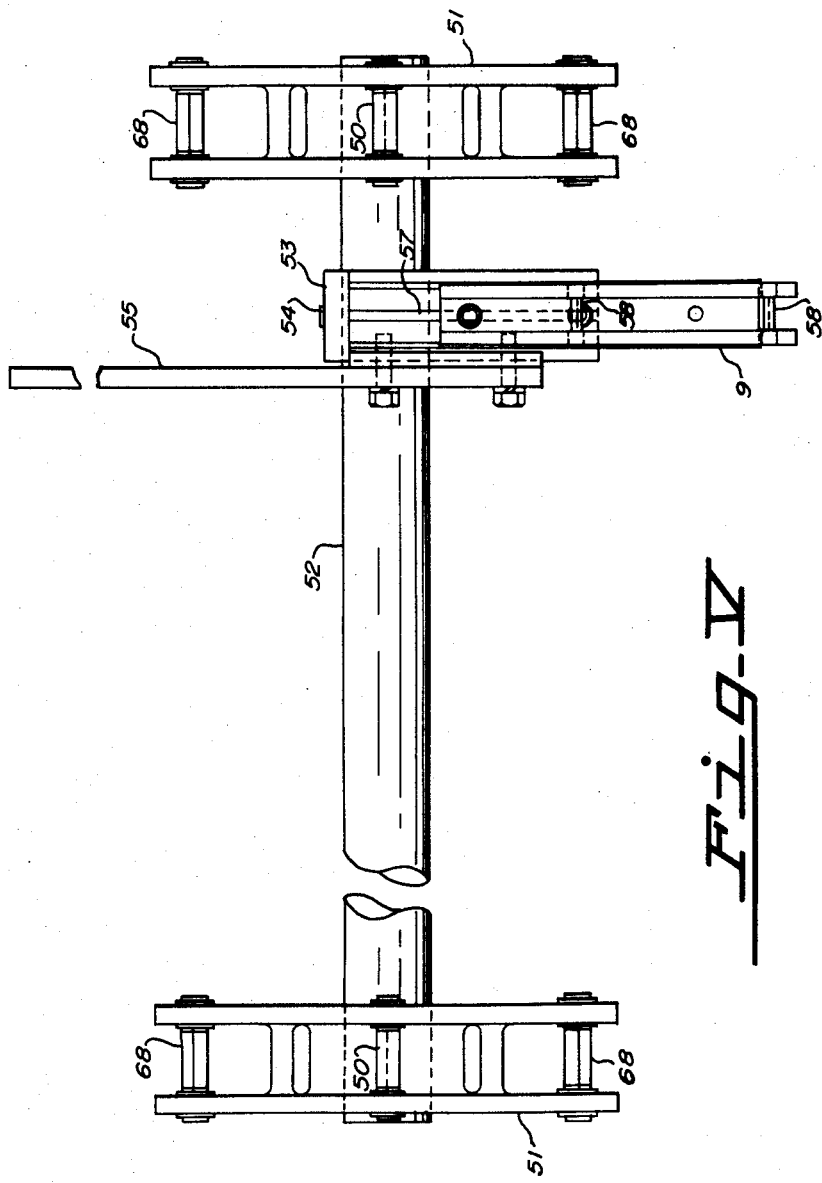

Dec. 22, 1959  R. B. WILLIAMS, JR  2,918,269
INTEGRATING CONVEYOR SCALE
Filed Sept. 25, 1956  7 Sheets-Sheet 6
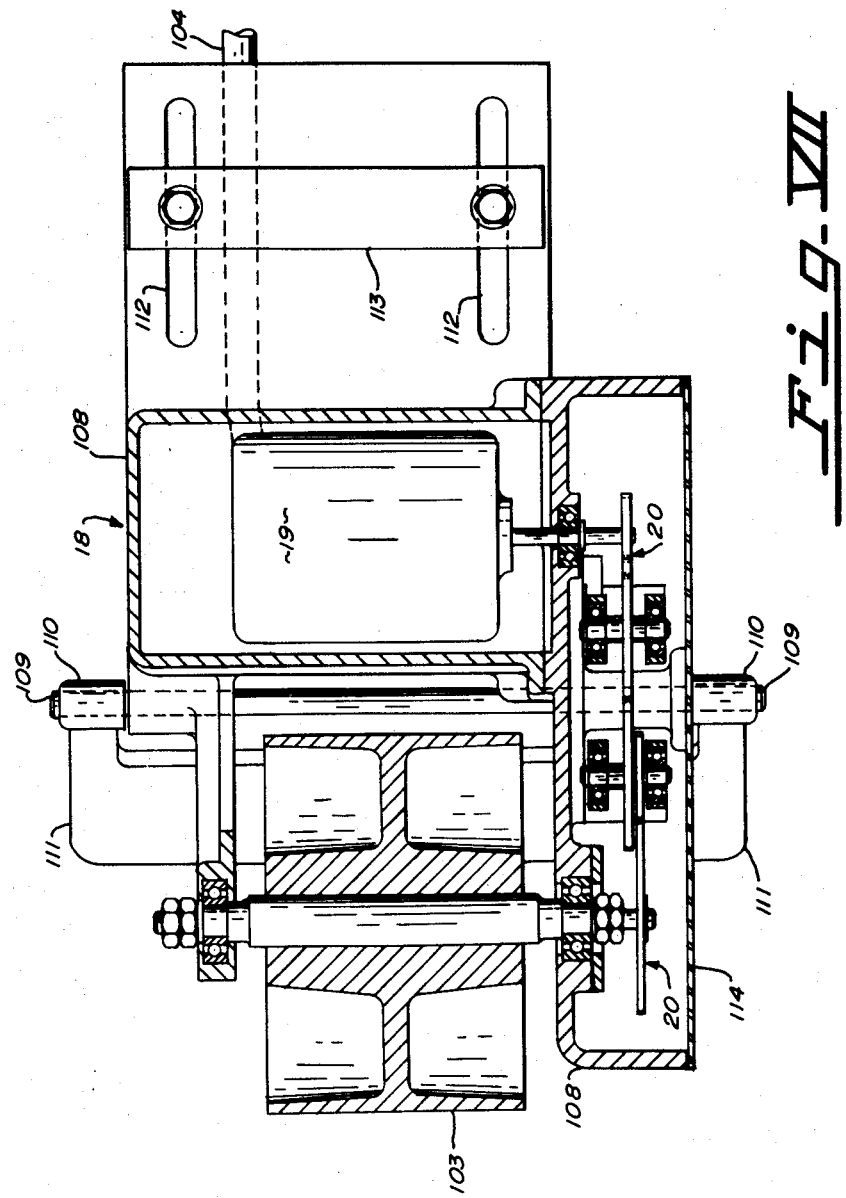
Fig. VII
INVENTOR.
ROGER B. WILLIAMS JR.
BY
*Marshall, Marshall & Yeasting*
ATTORNEYS Dec. 22, 1959 R. B. WILLIAMS, JR 2,918,269
INTEGRATING CONVEYOR SCALE
Filed Sept. 25, 1956 7 Sheets-Sheet 7
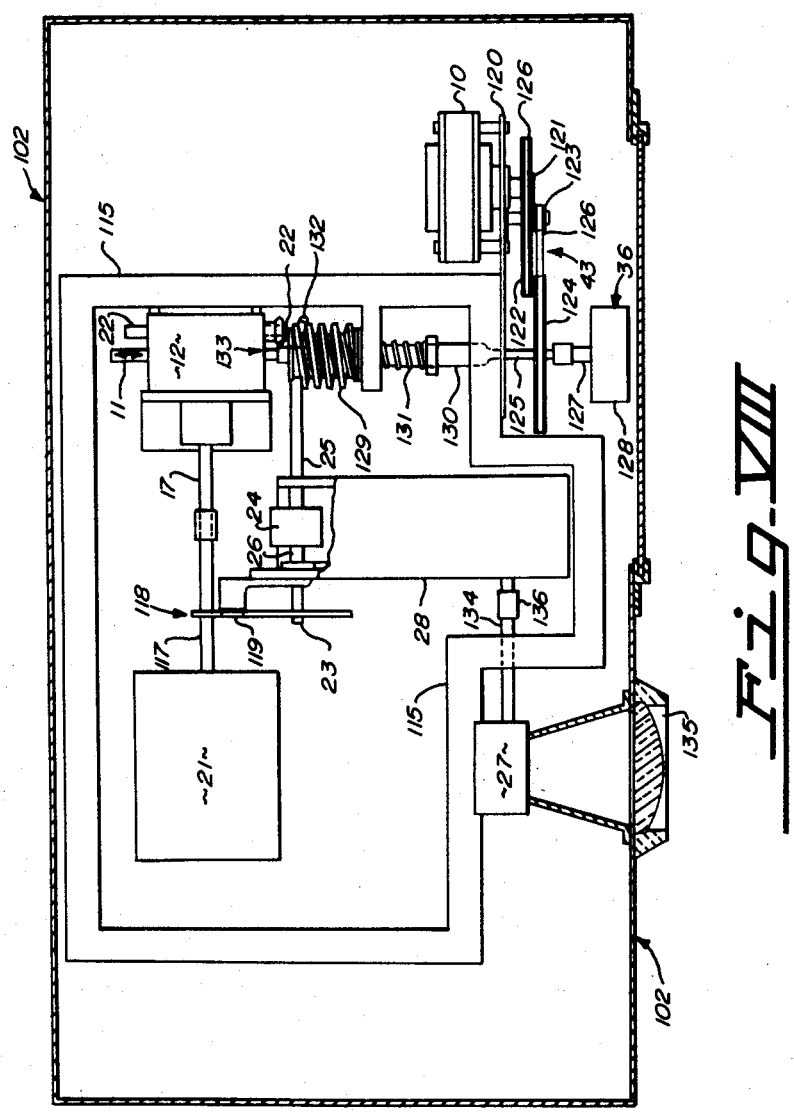
Fig. VIII
INVENTOR.
ROGER B. WILLIAMS JR.
BY
*Marshall, Marshall & Yeasting*
ATTORNEYS United States Patent Office 2,918,269
Patented Dec. 22, 1959

2,918,269

INTEGRATING CONVEYOR SCALE

Roger B. Williams, Jr., Toledo, Ohio, assignor, by mesne assignments, to Toledo Scale Corporation, Toledo, Ohio, a corporation of Ohio Application September 25, 1956, Serial No. 611,987

4 Claims. (Cl. 265—28)

This invention relates to weighing scales and in particular to weighing scales having means for continuously integrating the weight of material transported on a traveling belt.

The principal object of this invention is the provision of an integrating conveyor scale, capable of integrating two variable quantities—i.e., weight and speed, of simplified structure for ease of installation and service and for low cost construction.

Another object of the invention is the provision of a highly accurate integrating conveyor scale.

A further object is to provide a basic integrating conveyor scale which either will accept a wide range of conveyor belt speeds and a wide range of weights of material transported by the belt or which easily may be adapted to such speeds and weights.

Still another object of the invention is the provision of an integrating conveyor scale which may be installed on existing conveyor belt supports in the field.

Another object is the provision of an integrating conveyor scale comprising compact mechanical and electrical assemblies which are easily removable as units for repair.

Other objects and advantages will be apparent from the following description of a preferred form of the invention.

According to the invention, the improved integrating conveyor scale comprises a strain gage load cell properly mounted with necessary levers to keep the load within the limit of the cell as to magnitude and eccentricity, servomechanism including a servomotor, and a ball and disk integrator which is mechanically connected to the servomotor and also mechanically connected to a conveyor belt through proper change gears and flexible shaft or similar coupling means. Alternatively, the integrator may be mounted remotely from the weighing position by mechanically connecting it to a synchro receiver turning with a speed proportional to the speed of the conveyor belt. The integrator may be directly mechanically connected to a totalizing counter or the integrator and the synchro receiver may be mechanically connected through differential mechanism to the totalizing counter to indicate the total weight of material transported by the belt during a selected period of time.

A preferred embodiment of the invention is illustrated in the accompanying drawings. In the drawings:

Figure I is a diagrammatic representation of a conveyor weighing scale having means for continuously integrating the weight of material transported on a traveling belt and having means for indicating total weight of material transported by the belt during a selected period of time.

Figure II is a schematic wiring diagram showing the essential components of an electronic weighing scale.

Figure III is an elevational view of the weighing means of the integrating conveyor scale.

Figure IV is an elevational view, with parts shown in section, as seen from the line IV—IV of Figure III looking in the direction indicated by the arrows.

Figure V is a plan view of the lever mechanism which is illustrated in Figure III as seen from a position at the left hand side of Figure III looking down upon the lever mechanism.

Figure VI is an elevational view of a belt speed pick-up unit and percent of capacity indicating mechanism of the integrating conveyor scale.

Figure VII is an enlarged sectional view taken along the line VII—VII of Figure VI.

Figure VIII is an enlarged plan view, with parts shown in section, as seen from the line VIII—VIII of Figure VI.

These specific figures and the accompanying description are intended merely to illustrate the invention and not to impose limitations on the claims.

Referring to Figure I, the integrating conveyor scale generally comprises a commodity support 1 including a roller 2 which is positioned underneath a continuous conveyor belt 3 that serves as means for moving commodities over the support. The commodity support 1 and the portion of the belt passing thereover constitute a weighing platform. The conveyor belt 3 moves over the roller 2 in the direction indicated by the upper arrow and returns in the direction indicated by the lower arrow, passing over a second roller 4 on its return trip. The rollers 2 and 4 are pivotally suspended from the ends of an equal arm lever system 5 fulcrumed at 6 from a stationary frame 7. The weight of commodities passing over the roller 2 tends to pivot the lever system 5 in a counterclockwise direction about the fulcrum 6, as viewed in Figure I, and the weight of commodities, if any, adhering to the belt 3 passing over the roller 4 tends to pivot the lever system 5 in a clockwise direction about the fulcrum 6 to subtract automatically the weight of any material sticking to the belt from the total weight of commodities passing over the commodity support 1. Counterclockwise pivoting of the lever system 5 subjects a strain gage load cell 8 to a tension load, the lever system 5 and the load cell 8 being connected through a nose iron 9 of the lever system. The strain gage load cell 8 is properly mounted with necessary levers in the lever system 5 to keep the load within the limit of the cell as to magnitude and eccentricity. The instantaneous position of the equal arm lever system 5 is determined by the weight of material on the portion of the belt 3 supported by the roller 2 less the weight of material on the portion of the belt 3 supported by the roller 4, assuming that the belt has an unvarying weight per unit of length. In actual practice, belts have lighter and heavier sections and in a continuous operation such differences automatically are canceled or averaged out of the weighing results in the long run by means of the equal arm lever system.

The change in resistance of the load cell 8 with changing load is used to control a servomotor 10 mechanically connected to an input shaft 11 of an integrating device 12 of the general type shown in United States Patent No. 1,619,123, issued to H. O. Hem on March 1, 1927. Such an integrating device is of the ordinary "ball and disk" type and includes a rotatably mounted disk 13 and a ball cage 14 containing a pair of balls 15, the ball cage 14 being fixed to the end of the input shaft 11. One of the balls 15 is constantly in rolling contact with the plane surface of the disk 13 and the other of the balls 15 is constantly in rolling contact with the periphery of a cylinder 16, the balls also being in constant rolling contact with each other.

The input shaft 11 and the ball cage 14 fixed thereto of the integrating device 12 are positioned relative to the disk 13 in accordance with the instantaneous weight value of commodities upon the commodity support 1 less the instantaneous weight value of any material sticking to the portion of the belt 3 supported by the roller 4. The disk 13, fixed to a second input shaft 17 of the integrating device 12, is rotated at speeds proportional to the speeds of commodities over the commodity support 1 by means of a belt speed pick-up unit 18 driven by the belt 3 which unit drives in turn a synchro transmitter 19 through change gears 20, the synchro transmitter 19 being connected to a synchro receiver 21 (Selsyn) which is mechanically connected to the input shaft 17 that rotates the disk 13. The disk 13 friction drives the cylinder 16, fixedly attached to an output shaft 22, at a speed depending both upon the speed of rotation of the disk 13 and upon the distance (radius) that the ball cage 14 is located from the center of the disk. Hence, the output shaft 22 of the integrating device 12 is turned at a speed which is in direct proportion to the product of the speed of commodities over the support 1 and the weight of commodities upon the support 1.

The belt speed pick-up unit 18 also is connected to an input shaft 23 of ordinary differential mechanism 24 of the general type shown in United States Patent No. 1,920,024, issued to H. J. Stehli on July 25, 1933. Such mechanism includes the input shaft 23, a second input shaft 25 mechanically connected to the output shaft 22 of the integrating device 12, and an output shaft 26, the input shafts 23 and 25 being turned in opposite directions. Hence, both the disk 13 of the integrating device 12 and the input shaft 23 of the differential mechanism 24 are turned at speeds proportional to the speed of commodities over the support 1 and the input shaft 25 of the differential mechanism 24 is turned at a speed which is in direct proportion to the product of the speed of commodities over the support 1 and the weight of commodities upon the support 1. An ordinary totalizer 27 is connected through suitable change gears within a gear box 28 to the output shaft 26 of the differential mechanism 24 to indicate total flow of commodities over the commodity support 1 during a selected period of time.

The strain gage load cell 8 and the servo means are shown in more detail in Figure II. The load cell 8 comprises a resistance wire strain gage bridge 29 having resistance elements 30 in two of its legs and resistance elements 31 in the other two legs. The bridge 29 is of an ordinary type used in gages available for measuring strain wherein the elements 30 and 31 are adapted to change in resistance with changes in a condition to be measured, e.g., load applied to the load cell 8 by the nose iron 9 (Figure I).

In order that the point from which the measurements are made may be adjusted and that measurements of the values from such point may be obtained, there are provided leads 32 and 33 from the output terminals of the bridge 29 to sliding contacts 34 and 35 of potentiometers 36 and 37 connected at their ends and energized from a secondary winding 38 of a transformer 39. An amplifier and motor control device 40 is connected in circuit with the lead 32 and controls the operation of the servomotor 10 which positions the ball cage 14 (Figure I) and also both positions an indicator 41, which indicates percent of capacity on a stationarily mounted chart 42, and the sliding contact 34 through a belt drive 43 which is indicated by means of broken lines in Figure II. The sliding contact 35 is adapted to be positioned manually. A secondary winding 44 of the transformer 39 is connected to the bridge 29 for energizing the latter.

The potentiometers 36 and 37 with their adjustable contacts 34 and 35 form a bridge circuit and the bridge 29 forms a balanceable network that is adapted to be unbalanced in response to changes in load applied to the load cell 8, i.e., the network develops an output voltage between the leads 32 and 33 which is a function of load applied to the load cell or, in other words, the network serves as means for generating a signal proportional to the weight of load applied to the commodity support 1 (Figure I). The output voltage of the network opposes the output voltage of the potentiometer bridge circuit, the potentiometer 36 driven by the servomotor 10 serving as a continuously automatically adjustable voltage source, i.e., the potentiometer 36 driven by the servomotor 10 serves as means for generating a balancing signal. The output voltage of the strain gage network opposes the output voltage of the potentiometer bridge circuit connected thereto to determine the flow of current through the amplifier and motor control device 40. An unbalance of the output voltages results in operation of the servomotor 10 to position the indicator 41 and the contact 34 until the opposing voltages are equal, i.e., the servomotor is responsive to the difference between the signals from both the means for generating a signal proportional to the weight of a load applied to the commodity support 1 and the means for generating a balancing signal, whereby input voltage to the amplifier 40 is restored to null. An adjustment of the contact 35 results in a change in the positions of contact 34 to produce a balance for predetermined conditions to be measured. The positions of contact 34 are representative of the conditions measured, and a changing of these positions by adjustment of contact 35 merely results in an indication of the values from a different zero point.

Referring to Figures III, IV and V, the frame 7 includes vertical uprights 45 fixed to existing conveyor belt stringers 46 in the field and horizontal cross members 47 which are attached to the upper ends of the uprights to form a rigid structure which is movable with any flexing that may occur in the stringers. A pair of vertical rods 48 is adjustably mounted from the frame 7, the rods being spaced apart a distance which is about the length of the rollers 2 and 4. The rods 48 function to support the lever system 5, which is of a more or less ordinary type commonly used in hopper weighing scales, and each include a fulcrum bearing 49 within which a knife edge 50 of a twister 51 rests. Hence, the twisters 51 are rockable about their knife edges 50 which are shown as the pivot 6 in Figure I.

The twisters 51 support between them a horizontal shaft 52 and are rockable as one with the shaft. An adaptor 53 is pinned to the shaft at 54 and supports a lever 55, along which a counterweight 56 is slidable, and the nose iron 9, which is horizontally adjustable in slots 57 in the adaptor. The counterweight 56 functions to counterbalance most of the dead weight in the system so that all or nearly all of the capacity of the load cell 8 may be utilized for weighing commodities passing over the roller 2. The nose iron 9 includes a pair of knife edges 58 one or the other of which, depending upon the size of the weighing system, rests in a bearing 59 mounted at the end of a vertical rod 60 depending indirectly from the load cell 8. The load cell 8 is hung from the top of the frame 7 and, if the cell is of large capacity, e.g., 500 pounds, the rod 60 may be attached directly to the cell, however, if the cell is of low capacity, e.g., 50 pounds, the rod 60 is attached indirectly to the load cell through overload guarding mechanism 61. Such mechanism comprises a first plate 62, attached to the upper end of the rod 60, and a second plate 63 connected to the first plate 62 by means of rods 64 and operatively connected to the load cell 8 through a compression spring 65 and movable as one with the first plate. The second plate 63 is slidable on rods 66, fixed to the frame 7, a distance which is limited by stops 67 attached to the rods 66. Loads within the capacity of the load cell 8 are transmitted from the nose iron 9 through the rod 60 to the plate 63 which moves downwardly and subjects the load cell 8 to a tension load. Loads beyond the capacity of the load cell 8 cause the plate 63 to contact the stops 67 to prevent damage to the cell.

Each of the twisters 51 includes a pair of knife edges 68 equally spaced apart from the fulcrum bearing 49 so that each twister is an equal arm lever. As viewed in Figure III, the left hand knife edges 68, only one of which can be seen in Figure III, rockably support bearings 69 mounted at the ends of vertically adjustable rods 70 and the right hand knife edges 68, only one of which can be seen in Figure III, rockably support bearings 71 mounted at the ends of vertically adjustable rods 72.

A plate 73 is hung from the lower end of each of the vertical rods 70 by means of a pivot pin 74 which plate carries upper and lower members 75 and a casting 76. The upper member 75 functions as a mounting means for a bracket 77 and the lower member 75 functions as a mounting means for a pair of horizontal pipes 78 which extend between the plates 73 to impart rigidity to the structure. The roller 2 is rotatably mounted between the brackets 77 at an elevation which is the same as that of the existing conveyor rollers 79 (only one of which is shown) in the field and is positioned underneath the continuous conveyor belt 3 so that the roller 2 and the portion of the belt passing thereover constitute a weighing platform which needs no special section of the belt as a commodity support. It is to be understood that the conveyor belt 3 which is illustrated as being horizontal may be inclined, e.g., 20 degrees of inclination, in some installations.

Each of the plates 73 is checked against movement to the right or to the left, as viewed in Figure III, by means of check link bars 79 connected by pivot pins 80 to the castings 76 and to similarly shaped castings 81 adjustably attached to brackets 82 fixedly attached to the frame 7. In order that the check link bars 79 may be located parallel to the conveyor belt 3, the castings 76 are adjustably attached to the plates 73 and the castings 81 are adjustably attached to the brackets 82 by screws 83 which extend through cloverleaf-like openings in the castings and are threaded into the respective plates 73 and brackets 82. Each of the plates 73 also is checked against movement to the right or to the left, as viewed in Figure IV, by means of the heads of bolts 84 (Figure III) which are held by adjustment nuts 85 on brackets 86 fixed to the frame 7. The heads of the bolts 84 just barely touch the plates 73 to prevent such movement. Only one of the bolts 84 can be seen in Figure III and neither one can be seen in Figure IV, however, such bolts are exactly like and function like a pair of bolts 87 one of which may be seen at the lower part of Figure III and both of which may be seen in Figure IV and which are hereinafter described.

A plate 88 is hung from the lower end of each of the vertical rods 72 by means of a pivot pin 89 which plate carries a member 90 and a casting 91. The member 90 functions both as a mounting means for a bracket 92 and for a pair of horizontal pipes 93 which extend between the plates 88 to impart rigidity to the structure. The roller 4 is rotatably mounted between the brackets 92.

Each of the plates 88 is checked against movement to the right or to the left, as viewed in Figure III, by means of check link bars 94 connected by pivot pins 95 to the castings 91 and to similarly shaped castings 96 adjustably attached to brackets 97 fixedly attached to the frame 7. In order that the check link bars 94 may be located parallel to the conveyor belt 3, the castings 91 are adjustably attached to the plates 88 and the castings 96 are adjustably attached to the brackets 97 by screws 98 which extend through cloverleaf-like openings in the castings and are threaded into the respective plates 88 and brackets 97. Each of the plates 88 also is checked against movement to the right or to the left, as viewed in Figure IV, by means of the heads of the bolts 87 which are held by adjustment nuts 99 on brackets 100 fixedly attached to the frame 7. The heads of the bolts 87 just barely touch the plates 88 to prevent such movement.

In operation, the continuous conveyor belt 3 moves over the roller 2 in the direction indicated by the upper arrow in Figure III and returns in the direction indicated by the lower arrow, passing over the second roller 4 on its return trip. The weight of commodities passing over the roller 2 tends to pivot the twisters 51 in a counterclockwise direction about their knife edges 50, as viewed in Figure III, and the weight of commodities, if any, adhering to the belt 3 passing over the roller 4 tends to pivot the twisters 51 in a clockwise direction about their knife edges 50 to subtract automatically the weight of any material sticking to the belt from the total weight of commodities passing over the roller 2. Movement of the twisters 51 is transmitted through the nose iron 9 to the strain gage load cell 8 which generates an electrical signal that is proportional to the weight of the instantaneous net load applied to the roller 2. The electrical signal is carried through a cable 101 to a suitably mounted scale head 102 (Figure VI).

Referring to Figure VI, the belt speed pick-up unit 18 is pivotally mounted underneath the conveyor belt 3 which moves over a pulley 103 of the unit in the direction indicated by the arrow. The output of the unit 18 may be used to drive directly, through proper change gears and flexible shaft or similar coupling means, the integrating device 12 or, alternatively as shown in Figure VI, the unit 18 may be mounted remotely from the scale head and connected thereto through an electrical speed transmitting cable 104. The belt speed pick-up unit 18 is mounted on an angle iron 105 welded to the existing conveyor belt stringers 46 in the field and may be oiled by means of a cup 106 which also is mounted on an angle iron 107 welded to the existing stringers in the field.

Referring to Figures VI and VII, the belt speed pick-up unit 18 includes a rigid frame 108 which is rockable about the axis of an axle 109 held between the ears 110 of a bracket 111 fixedly attached to the angle iron 105. A tail portion of the frame 108 has a pair of slots 112 within which a counterweight 113 is adjustably secured to rock the pulley 103, journaled in the frame 108, about the axis of the axle 109 into contact with the belt 3. The counterweight 113 is adjusted to obtain the desired pressure against the belt, the pulley being preferably well centered on the belt.

The pulley 103, driven by the conveyor belt 3, drives in turn the synchro transmitter 19 through a series of change gears 20 at speeds proportional to the speeds of the belt 3, the gears 20 being mounted for rotation on the frame 108 and readily accessible by the removal of a cover 114 and the synchro transmitter 19 being fixedly attached to the frame. The change gears 20 are designed to maintain an input speed to the integrating device 12 of 80 to 240 r.p.m. and preferably 100 to 200 r.p.m. regardless of the conveyor belt speed for efficient integrator operation. Normal operating variations in conveyor belt speeds do not affect the accuracy of the weighing scale.

The scale head 102 (Figure VI) houses certain of the electrical components of the system, which are illustrated schematically in Figure II, in a compact assembly for ease of installation and repair and also houses the servomotor 10, integrating device 12, synchro receiver 21, differential mechanism 24, totalizer 27, and gear box 28, which also are illustrated schematically in Figure II, in a second compact assembly. The integrator and differential units are subject to wear and, therefore, great care is taken for their protection. One of the important features of the invention resides in the fact that the integrating conveyor scale comprises compact mechanical and electrical assemblies which are easily removable as units for repair.

Referring to Figures VI and VIII, a housing 115 within the scale head 102, especially designed for ease of servicing or replacement, is easily accessible by removing a cover 116 from the front of the scale head. The housing 115 normally is completely closed by a cover which has been removed from the housing, as shown in Figure VIII, for clarity of illustration. When the cover is in place, the housing 115 is resistant to water, dust, and the entrance of corrosive atmospheres.

The synchro receiver 21, fixedly attached to the floor of the housing 115, is connected by the cable 104 (Figure VI) to the synchro transmitter 19 and has an output shaft 117 which turns with a speed that is proportional to the speed of the conveyor belt 3. The output shaft 117 of the synchro receiver 21 is directly coupled to the input shaft 17 of the integrating device 12 and is connected to the input shaft 23 of the differential mechanism 24 through a gear train 118 which functions through an idler 119 to reverse the direction of rotation.

The servomotor 10, fixedly attached to a plate 120 extending from the housing 115, both positions the indicator 41 (Figures II and VI) and the sliding contact 34 of the potentiometer 36 (Figures II and VIII) through the belt drive 43 which is shown schematically in Figure II and in detail in Figure VIII. The belt drive 43 includes a pulley 121 which turns as one with the drive shaft of the servomotor 10, an idler sheave 122 and connected pulley 123 mounted for rotation from the plate 120, a second sheave 124 mounted on an indicator shaft 125 which is journaled in the housing 115 and which carries the indicator 41, and a pair of suitable belts 126 interconnecting the pulley 121 and the sheave 122 and the pulley 123 and the sheave 124. The belt drive 43 drivingly connects the servomotor 10 to the indicator shaft 125 and to the shaft 127 of the potentiometer 36, which shaft 127 positions the contact 34, by means of the sheave 124 that is a common drive means for both of the shafts, the shafts 125 and 127 being axially aligned and rigidly coupled together. Thus, it is assured that the shafts 125 and 127 always turn as one. The entire potentiometer structure including its case 128 is supported from the indicator shaft 125, the case 128 being carried directly by the potentiometer shaft 127.

The sheave 124 also functions to turn a worm 129 axially aligned and rigidly coupled, through a shaft 130, to the indicator shaft 125, there being a spring 131 surrounding part of the shaft 130 to take up any play in the system. Hence, the indicator 41 attached to the indicator shaft 125, the contact 34 attached to the potentiometer shaft 127, and the worm 129 all are driven by the servomotor 10 in accordance with the instantaneous weight value of commodities upon the commodity support 1. A pin follower 132 on the input shaft 11 of the integrating device 12 which cooperates with the worm 129 causes the shaft 11 to be axially positioned as indicated by the double-ended arrow in Figure VIII to position the ball cage 14 (Figure I) relative to the disk 13 (Figure I). As hereinbefore described in connection with Figure I, the output shaft 22 of the integrating device 12 is turned at a speed which is in direct proportion to the product of the speed of commodities over the support 1 and the weight of commodities upon the support 1.

The output shaft 22 of the integrating device 12 is connected through bevel gears 133 to the input shaft 25 of the differential mechanism 24 which has its output shaft 26 connected through the change gears within the gear box 28, to an input shaft 134 of the totalizer 27 (revolution counter) that indicates total flow of commodities over the commodity support 1 during a selected period of time. Such indication is presented through a magnifying viewer 135 at the front of the scale head 102. The change gears in the box 28 are designed for suitable totalizer speeds of from 600 to 6000 counts per hour.

The totalizer 27 may be of the type which can be preset to a desired value for closing a circuit when the preset quantity is reached. Such a totalizer is used as a cutoff device. A remote totalizer (not shown) may be provided by mounting a synchro transmitter in the space in the housing 115 adjacent the synchro receiver 21 and driving such transmitter from a gear which may be mounted on the shaft 134 near a coupling 136 presently on the shaft. The synchro transmitter is connected to a remotely located synchro receiver (not shown) which directly drives the remote totalizer.

Another of the important features of the improved integrating conveyor scale resides in the fact that it has a simplified basic design which either will accept a wide range of conveyor belt speeds and a wide range of weights of material transported by the belt or which easily may be adapted to such speeds and weights, i.e., the scale does not have to be designed especially for a particular installation. The capacity of the load cell 8 is chosen for the particular range of loads expected and the indicator 41 indicates percent of capacity on the chart 42. The change gears 20 and those in the gear box 28 overlap so that standard arrangements are available for standard nominal scale capacities so far as is possible. This insures that scales for various installations will require as few special parts as possible. If a special installation has unusual conveyor belt speeds or loadings it is a simple matter to install the proper size of load cell and a suitable combination of change gears.

Still another of the important features of the improved integrating conveyor scale is the provision of the ball and disk integrating device 12 in combination with the differential mechanism 24 which is so arranged that the integrating device is operated only on the outer portion of the disk radius to prevent prolonged operation at the center of the disk, thus eliminating heavy wear at the center of the disk which otherwise would materially affect the accuracy of the integrating device. Since the output shaft 22 of the integrating device 12 is turned at a speed which is in direct proportion to the product of the speed of commodities over the support 1 and the weight of commodities upon the support 1, the integrator may be coupled directly to a totalizer as is done in prior art devices. However, such an arrangement is unsatisfactory because it causes prolonged operation of the balls at the center of the disk to produce a dimple in the center of the plane surface of the disk which materially affects the accuracy of the integrator.

In the present arrangement of integrator and differential, one value which represents a constant plus a weight reading ($K+WR$) is fed into the integrator 12 via the input shaft 11 and a second value which represents belt travel ($T$) is fed into the integrator via the input shaft 17. Also, a value which represents a constant times the belt travel ($K_1T$) is fed into the differential mechanism 24 via the input shaft 23. The output of the integrator 12 on its shaft and consequently the input to the differential mechanism 24 on its shaft 25, therefore, may be represented by $(K+WR)T$ and the output of the differential mechanism on its shaft 26, if $K=K_1$, therefore, may be represented by the equation:

$$KT+WRT-K_1T=WRT$$

WRT being indicated by the totalizer 27. K is chosen large enough so that even if WR is less than zero $K+WR$ is always greater than zero and, consequently, the ball carriage 14 operates away from the center portion of the disk 13 to prevent a dimple being formed by one of the balls 15 on the center of the plane surface of the disk.

Various modifications may be made in details without departing from the scope of the claims.

Having described the invention, I claim:

1. A weighing scale comprising, in combination, a commodity support, conveyor means for moving commodities over the commodity support, an integrating device including a disk, a ball cage and an output shaft, differential mechanism having a pair of input shafts and an output shaft, means for rotating the disk of the integrating device at speeds proportional to the speed of movement of commodities over the support and for rotating one of the input shafts of the differential mechanism at said speeds times a constant factor, a servo motor connected to the ball cage, means in circuit with the servo motor for controlling said motor to position the ball cage with respect to the disk to a finite radius that produces an input to the integrating device equal to said constant factor, load cell means operatively connected to the commodity support in circuit with the servo motor for causing displacement of the ball cage by the motor from said finite radius, in accordance with the instantaneous weight value of commodities upon the commodity support, whereby the ball cage always operates away from the center portion of the disk to prevent a dimple being formed on the center of the disk, the other one of the input shafts of the differential mechanism being driven by the output shaft of the integrating device, the input shafts of the differential mechanism being turned in opposite directions, and a totalizer operatively connected to the output shaft of the differential mechanism to indicate integrated weight values of the commodities.

2. A weighing scale according to claim 1 wherein the commodity support comprises a pivotally suspended roller and means are provided for checking bodily movement of the roller in the direction of movement of the conveyor means.

3. A weighing scale according to claim 2 wherein the means for checking bodily movement of the roller comprises a plurality of check links and wherein means are provided to adjustably position the check links parallel to the conveyor means.

4. A weighing scale according to claim 1 wherein the means for rotating the disk includes a belt speed pick-up unit comprising a fulcrum adjacent the conveyor means, a frame pivoted on the fulcrum, a pulley rotatably mounted on the frame at one side of the fulcrum, and a counterweight that is adjustably mounted on the frame at the other side of the fulcrum and that rocks the pulley against the conveyor means.

References Cited in the file of this patent
UNITED STATES PATENTS

| | | |
|---|---|---|
| 1,032,183 | Buchan | July 9, 1912 |
| 1,174,337 | Messiter | Mar. 7, 1916 |
| 1,619,123 | Hem | Mar. 1, 1927 |
| 1,920,024 | Stehli | July 25, 1933 |
| 2,228,068 | White | Jan. 7, 1941 |
| 2,261,655 | Lowe | Nov. 4, 1941 |
| 2,461,635 | Feller | Feb. 15, 1949 |
| 2,664,286 | Frazel | Dec. 29, 1953 |
| 2,766,981 | Lauler et al. | Oct. 16, 1956 |